(12) United States Patent
Kallevig et al.

(10) Patent No.: US 7,854,345 B2
(45) Date of Patent: Dec. 21, 2010

(54) VEHICULAR FUEL TANK ARRANGEMENT

(75) Inventors: Dane M. Kallevig, Spicer, MN (US); Kevin C. Lent, Glenwood, MN (US); Stephen H. Stuhr, Blomkest, MN (US)

(73) Assignee: CNH America LLC, New Holland, PA (US)

( * ) Notice: Subject to any disclaimer, the term of this patent is extended or adjusted under 35 U.S.C. 154(b) by 1215 days.

(21) Appl. No.: 11/420,128

(22) Filed: May 24, 2006

(65) Prior Publication Data

US 2007/0272696 A1 Nov. 29, 2007

(51) Int. Cl.
B65D 47/02 (2006.01)

(52) U.S. Cl. .................. 220/562; 137/587; 141/59; 206/335; 215/396; 215/398; 215/902; 220/86.1; 220/86.2

(58) Field of Classification Search .............. 137/587; 206/335; 220/86.2, 562, 86.1; 141/59; 215/396, 215/398, 902

See application file for complete search history.

(56) References Cited

U.S. PATENT DOCUMENTS

| 3,187,936 | A |   | 6/1965  | Downing |
|-----------|---|---|---------|---------|
| 3,330,439 | A |   | 7/1967  | Moorman |
| 4,526,286 | A |   | 7/1985  | Jueng et al. |
| 4,625,777 | A | * | 12/1986 | Schmidt ............ 141/286 |
| 4,723,596 | A |   | 2/1988  | Spindelboeck et al. |
| 4,756,411 | A |   | 7/1988  | Garland |
| 4,799,509 | A |   | 1/1989  | Wawra et al. |
| 4,978,027 | A |   | 12/1990 | Larson |
| 5,251,773 | A |   | 10/1993 | Bowles et al. |
| 5,704,337 | A |   | 1/1998  | Straetz et al. |
| 6,655,426 | B2 |  | 12/2003 | Shevela |
| 2003/0184094 | A1 | * | 10/2003 | Sodemann et al. .......... 290/1 A |
| 2007/0017918 | A1 | * | 1/2007 | Kirk et al. .................. 220/563 |

FOREIGN PATENT DOCUMENTS

JP   2003-136975   5/2003

* cited by examiner

Primary Examiner—Anthony Stashick
Assistant Examiner—Elizabeth Volz
(74) Attorney, Agent, or Firm—Rebecca Henkel

(57) ABSTRACT

A fuel tank arrangement for a vehicular agricultural applicator is provided. The fuel tank arrangement includes a fuel tank having an interior cavity defined by an uppermost wall, a lowermost wall, and a series of side walls extending therebetween. The interior cavity includes an expansion space defined upwardly in the vertical direction above a maximum fill line. The arrangement further includes a fill neck extending from the uppermost wall to receive the supply of fuel. The fill neck includes an uppermost end opposite a lowermost end that defines the maximum fill line. A bridge that defines a passage therethrough interconnects the fill neck and the expansion space of the fuel tank. A lowermost end of the passage is horizontally aligned at the lowermost end of the fill neck, and the passage extends upwardly in the vertically direction therefrom.

19 Claims, 3 Drawing Sheets

VEHICULAR FUEL TANK ARRANGEMENT

CROSS-REFERENCE TO RELATED APPLICATIONS

Not applicable.

BACKGROUND OF THE INVENTION

1. Field of Invention

The invention relates to a vehicular fuel tank arrangement and, more specifically, to a vehicular fuel tank arrangement with an air passage configured to ventilate fuel vapor so as to accommodate fuel expansion associated with an increased ambient temperature and/or operating temperature of the fuel system above ambient temperature.

2. Related References

Numerous types of vehicular agricultural applicators are available today that include a conventional fuel tank arrangement configured to supply fuel to power an engine. The convention fuel tank arrangement includes a fill pipe or neck configured to receive a supply fuel to a fuel tank.

A problem encountered with conventional fuel tank arrangements is related to expansion in a volume of fuel stored in the fuel tank associated with an increase in ambient temperature and/or operating temperature of the fuel system above ambient temperature during operation of the vehicular applicator. Consequently, there is a desire for a fuel tank arrangement configured to accommodate this volumetric fuel expansion in the fuel tank during operation of the vehicular applicator. In addition, there is also need to ventilate fuel vapors from the fuel tank so as to accommodate the volumetric fuel expansion.

SUMMARY OF THE INVENTION

The present invention provides a vehicular fuel tank arrangement that addresses the drawbacks described above. The fuel tank arrangement of the invention provides for expansion in a volume of the fuel associated with an elevated ambient temperature above the temperature of the fuel at time of tank filling and/or elevated operating temperatures above ambient temperature. The fuel tank arrangement of the invention also provides for ventilation of displaced air to the atmosphere associated with the expansion of the fuel volume. The fuel tank arrangement also allows for easier manufacturing and assembly, and can be readily applied to various types of vehicles.

In the preferred embodiment of the invention, the fuel tank arrangement is connected in combination with an inlet of a fuel pump so as to provide a supply of fuel to an engine. The fuel tank arrangement includes a fuel tank having an interior cavity defined by an uppermost wall, a lowermost wall, and a series of side walls extending therebetween. The interior cavity includes an expansion space defined upwardly in the vertical direction above a maximum fill line. The fuel tank further includes an opening to receive the inlet of the fuel pump to the engine. The arrangement further includes a fill neck extending upwardly from the uppermost wall to receive the supply of fuel. The fill neck includes an uppermost end opposite a lowermost end that defines the maximum fill line. A bridge that defines a passage therethrough interconnects the fill neck and the expansion space of the fuel tank. A lowermost end of the passage is generally horizontally aligned at the lowermost end of the fill neck, and the passage extends upwardly in the generally vertical direction therefrom.

In the preferred embodiment of the fuel tank, the uppermost wall includes a first generally horizontal aligned portion located a spaced distance downwardly in a vertical direction relative to an uppermost edge of a second portion aligned at a non-zero angle relative to horizontal, and the expansion space is defined in the vertical direction by the spaced distance between the first and second portions of the uppermost wall. In the preferred embodiment, the uppermost wall of the fuel tank is continuously aligned at the non-zero angle between a lowermost end and an uppermost end in the vertical direction. The uppermost wall of the bridge is generally continuously aligned at the non-zero angle above horizontal relative to the second portion of the uppermost wall of the fuel tank. The first portion of the uppermost wall of the fuel tank intersects at only two of the series of sidewalls that define the interior cavity. The lowermost end of the upperwall of the fuel tank intersects at a third sidewall located opposite the two sidewalls that intersect the first portion.

The fill neck is aligned in a generally vertical direction and includes an uppermost end opposite a lowermost end that connects at the first portion of the uppermost wall. The fill neck is generally cylindrical-shaped and does not extend below the first portion of the uppermost wall of the fuel tank. The lowermost end of the fill neck defines a maximum level of fuel received in the fuel tank. The fuel tank further comprises a cap detachably enclosing the uppermost end of the fill neck. The cap includes an opening therethrough to vent the interior cavity to an atmosphere.

The preferred embodiment of the bridge connects at the fill neck generally diametrically opposite the intersection of the first portion of the uppermost wall with the sidewalls. Except where the bridge connects at the fill neck, the generally horizontal aligned first portion of the uppermost wall substantially surrounds a perimeter of the fill neck in top plan view. An uppermost end of the passage is located below an uppermost end of the fill neck. The air passage is generally rectangular-shaped in vertical cross-section. Each vertical cross-section through the passage is less in cross-sectional area than a cross-sectional across a diameter of the fill neck. The bridge is narrower in width in top plan view relative to a smallest diameter of the fill neck, and its lowermost end connects at the first portion of the uppermost wall of the fuel tank, such that the lowermost end of the passage defined by the bridge is aligned at the maximum fill line with the lowermost end of the fill neck.

The present invention also provides a method of venting a fuel tank of a vehicular agricultural applicator, the method comprising the steps of providing a fuel tank having an interior cavity defined by an uppermost wall, a lowermost wall, and a plurality of side walls extending therebetween, the uppermost wall including a first generally horizontal aligned portion located a spaced distance downwardly in a vertical direction relative to an uppermost edge of a second portion aligned at a non-zero angle relative to horizontal, the interior cavity including an expansion portion defined by the spaced distance between the first portion and the second portion of the uppermost wall, the lowermost end of the fill neck defining a maximum fill line; and venting the fuel tank from between the maximum fill line and the uppermost wall of the fuel tank and through an air passage, having a lowermost end at the maximum fill line, to the fill neck; and vent through the fill neck and an opening in a detachable cap enclosing an uppermost end of the fill neck.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
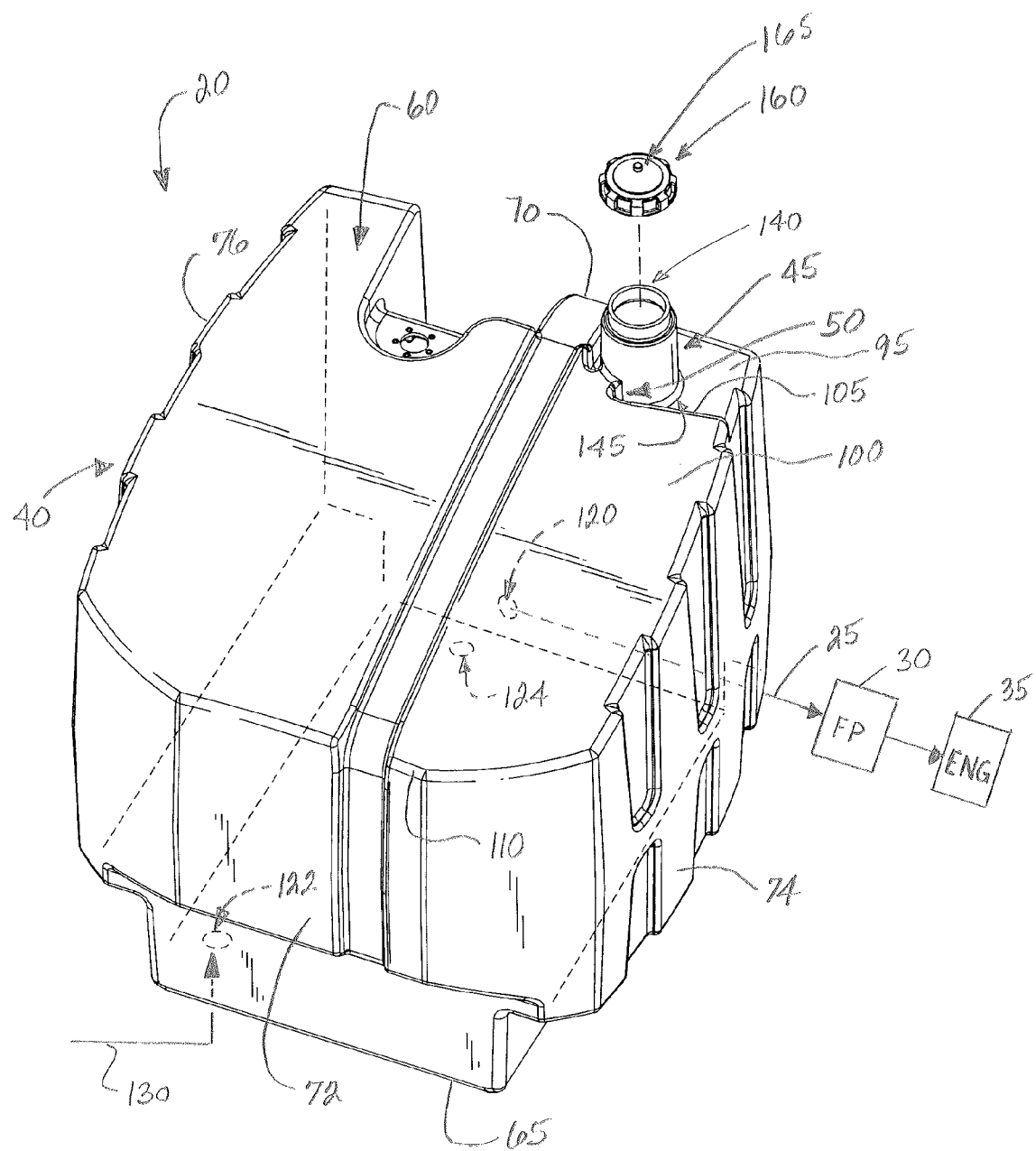
FIG. 1 illustrates an isometric view of a fuel tank arrangement in accordance with the present invention.
Figure 2:
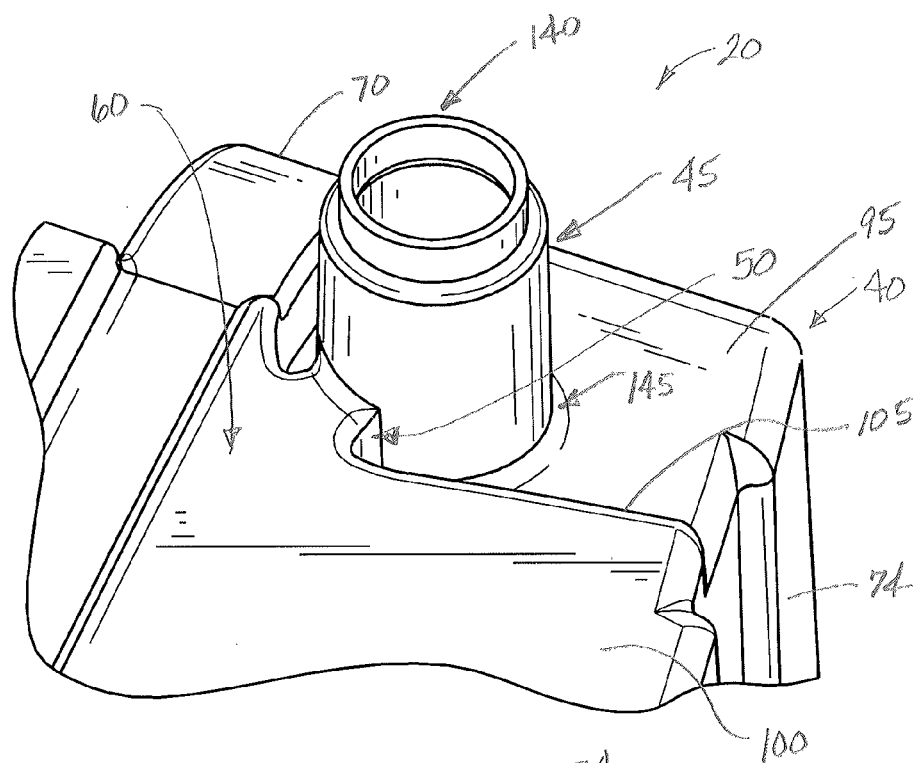
FIG. 2 illustrates a detailed isometric view of a fill neck of the fuel tank arrangement shown in FIG. 1, the fill neck connected by an air passage to a raised expansion space.

FIG. 1 illustrates an exemplary fuel tank arrangement 20 constructed in accordance with the present invention connected in combination with an inlet 25 of a fuel pump 30 to provide a supply of fuel to power an engine 35 of the vehicular agricultural applicator (not shown). The exemplary fuel tank arrangement 20 includes a fuel tank 40, a fill neck 45, and a bridge 50 operable to ventilate the fuel tank 40 through the fill neck 45 and on to the atmosphere.

Figure 4:
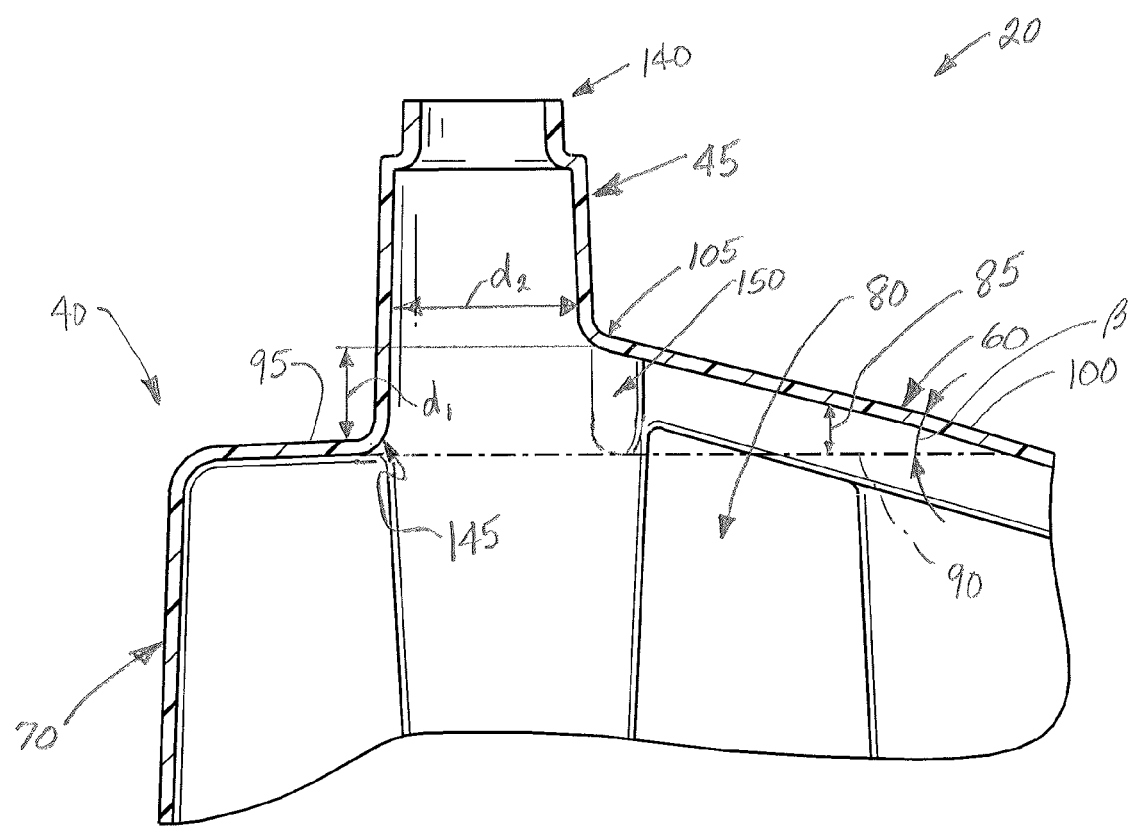
FIG. 4 illustrates a detailed section view along line 4-4 in FIG. 3.

FIG. 1 illustrates the exemplary fuel tank 40 including an uppermost wall 60, a lowermost wall 65, and a series of side walls 70, 72, 74 and 76 extending therebetween that define an interior cavity 80 illustrated in FIG. 4. Referring now to FIG. 4, the interior cavity 80 includes an expansion space 85 defined upwardly in the vertical direction above a maximum fill line 90 to the uppermost wall 60. The exemplary uppermost wall 60 generally includes a generally horizontal aligned portion 95 and an angled portion 100 aligned at a generally non-zero angle ($\beta$) above horizontal. The lower surface of the horizontal aligned portion 95 is generally aligned and continuous with the maximum fill line 90 of the fuel tank 40. In top plan view, the horizontal aligned portion 95 generally surrounds a perimeter of the fill neck 45 except for the bridge 50. The generally horizontal-aligned portion 95 is located a spaced distance ($d_1$) downwardly in the vertical direction relative to an uppermost end 105 of the angled portion 100. Thus, the expansion space 85 is defined in the vertical direction by the variable spaced distance between the generally horizontal-aligned and the angled portions 95 and 100 of the uppermost wall 60.

Referring back to FIG. 1, the horizontal portion 95 of the uppermost wall 60 of the fuel tank 40 intersects at only two of the series of sidewalls 70 and 74 that define the interior cavity 80. The exemplary uppermost wall 60 of the fuel tank 40 is continuously aligned at the non-zero angle ($\beta$) illustrated in FIG. 4 between a lowermost end 110 and the uppermost end 105 in the vertical direction. The lowermost end 110 of the uppermost wall 60 of the fuel tank 40 intersects at a third sidewall 72 located opposite the sidewall 70.

Still referring to FIG. 1, in addition to the fill neck 45, the exemplary fuel tank 40 includes a series of openings or ports 120, 122 and 124 in communication to the interior cavity 80 of the fuel tank 40. The fuel supply port 120 is configured to receive the inlet 25 of the fuel pump 30, such that the fuel pump 30 in a conventional manner is operable to provide fuel from the fuel tank 40 to power the engine 35 of the vehicular applicator (not shown). The fuel return port 122 is configured to receive a return line 130 carrying a return flow of fuel to the fuel tank 40. The tank drain port 124 is configured to receive a plug or line (not shown) so as to selectively drain the fuel supply from the fuel tank 40.

As shown in FIGS. 1-4, the exemplary fill neck 45 is generally cylindrical-shaped and includes an uppermost end 140 opposite a lowermost end 145 aligned in a generally vertical direction. Referring specifically to FIG. 4, the lowermost end 145 connects at the first generally horizontal aligned portion 95 of the uppermost wall 60 and is generally aligned with the maximum fill line 90. The fill neck 45 does not extend below the horizontal-aligned portion 95 of the uppermost wall 60 of the fuel tank 40.

Figure 3:
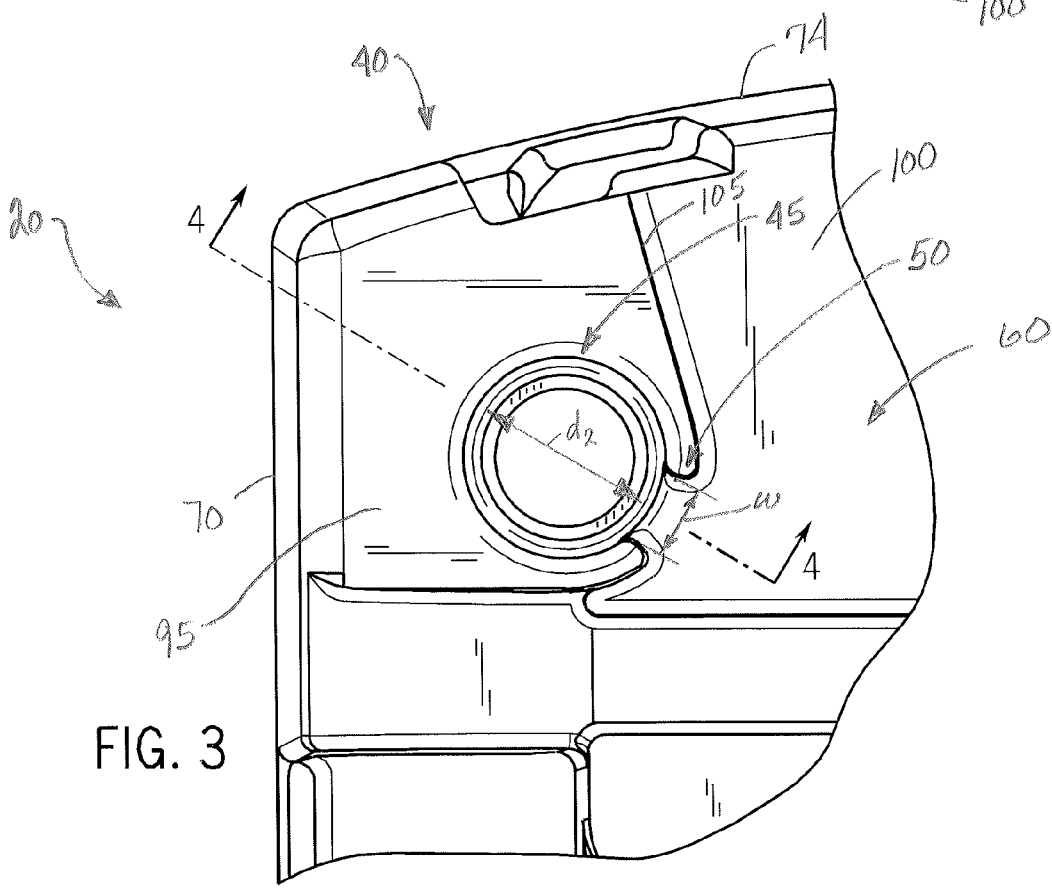
FIG. 3 illustrates a detailed top plan view of the fill neck and air passage shown in FIG. 2.

Still referring to FIG. 4, the bridge 50 defines a passage 150 therethrough that interconnects the fill neck 45 to the expansion space 85 defined by the fuel tank 40. The preferred embodiment of the bridge 50 connects at the fill neck 45 generally diametrically opposite an intersection of the sidewalls 70 and 74 (see FIG. 3). A lowermost end 155 of the passage 150 is generally horizontally aligned at the lowermost end 145 of the fill neck 45, and the passage 150 extends upwardly in the general vertical direction therefrom. An uppermost end of the passage 150 is located below the uppermost end 140 of the fill neck 45. The passage 150 is generally rectangular-shaped in vertical cross-section. Referring now to FIG. 3, the bridge 50 is narrower in width (w) in top plan view relative to a diameter ($d_2$) of the fill neck 45.

As illustrated in FIG. 1, the fuel tank arrangement 20 further comprises a detachable cap 160 enclosing the open uppermost end 140 of the fill neck 45. The cap 160 includes an opening 165 extending therethrough to ventilate the interior cavity 80 of fuel tank 40 through the passage 80 of the bridge 50, and through the fill neck 45 to the atmosphere.

Having provided the above-description of the general construction of the fuel tank arrangement 20 of the invention, the following is a general description of the operation of the fuel tank arrangement 20. The cap 160 is removed such that the fill neck 45 communicates a supply of fuel to fill the interior cavity 80 of the fuel tank 40 to the maximum fill line 90. The cap 160 is then replaced. Assume for example that the engine 35 is not operating. A temperature of the fuel supply may increase in a conventional manner to equalize with an ambient temperature with the fuel tank 40. Also, the temperature of the fuel supply may further increase in a conventional manner to equalize with an increased operating temperature above ambient temperature in association with operation of the engine 35. The increase in temperature of the fuel supply can cause volumetric expansion of the fuel, forcing fuel vapor and/or air from the expansion space 85 toward the passage 150 of the bridge 50 as defined by the maximum fuel line 90. The passage 150 communicates the fuel vapor and air mixture to the fill neck 45 for release via the opening 165 in the cap 160 to the atmosphere. Also, the passage 150 in the bridge 50 allows ventilation or circulation of air through the cap 160 and the fill neck 45 to the expansion space 85 of the fuel tank 40.

A wide variety of vehicles could employ the fuel tank arrangement 20 of the invention. Hence, while the fuel tank arrangement 20 is described above with reference to a vehicular agricultural applicator, it should be understood that the invention is in no way so limited. The fuel tank arrangement 20 can be employed on any type of vehicle and is not limiting on the invention.

Many changes and modifications could be made to the invention without departing from the spirit thereof. The scope of these changes will become apparent from the appended claims.

We claim:

1. A fuel tank arrangement connected in combination with an inlet of a fuel pump so as to provide a supply of fuel to an engine, comprising:
   a fuel tank having an interior cavity defined by an uppermost wall, a lowermost wall, and a plurality of side walls extending therebetween, the interior cavity including an expansion space defined upwardly in the vertical direction above a maximum fill line;
   a fill neck extending from the uppermost wall to receive the supply of fuel, the fill neck including an uppermost end opposite a lowermost end that defines the maximum fill line; and
   a bridge that defines a passage therethrough that interconnects the fill neck and the expansion space of the fuel tank, the passage having a lowermost point,
   wherein:
   the maximum fill line is generally horizontal; and
   the maximum fill line intersects the lowermost point of the passage, the passage extending upwardly in the vertically direction therefrom.

2. The fuel tank arrangement as recited in claim 1, wherein the fill neck is aligned in a generally vertical direction and includes an uppermost end opposite a lowermost end that connects at the first generally horizontal aligned portion of the uppermost wall.

3. The fuel tank arrangement as recited in claim 1, further comprising a cap detachably enclosing the uppermost end of the fill neck, the cap including an opening therethrough configured to ventilate the interior cavity.

4. The fuel tank arrangement as recited in claim 1, wherein a lowermost end of the bridge connects at the first portion of the uppermost wall.

5. The fuel tank arrangement as recited in claim 1, wherein the maximum fill line defines a lowermost end of the passage.

6. The fuel tank arrangement as recited in claim 1, wherein an entirety of the passage is not separated from an interior of the fill neck by a common wall.

7. The fuel tank arrangement as recited in claim 1, wherein the fill neck is generally cylindrical-shaped and does not extend below the first portion of the uppermost wall of the fuel tank.

8. The fuel tank arrangement as recited in claim 1, wherein the uppermost wall of the fuel tank includes a first generally horizontal aligned portion located a spaced distance downwardly in a vertical direction relative to an uppermost edge of a second portion aligned at a non-zero angle relative to horizontal, and wherein the expansion space is defined in the vertical direction by the spaced distance between the first and second portions of the uppermost wall.

9. The fuel tank arrangement as recited in claim 1, wherein the uppermost wall of the bridge is generally continuously aligned at the non-zero angle above horizontal relative to the second portion of the uppermost wall of the fuel tank.

10. The fuel tank arrangement as recited claim 9, wherein the bridge connects at the fill neck generally diametrically opposite the intersection.

11. The fuel tank arrangement as recited in claim 1, wherein the bridge is narrower in width in top plan view relative to a smallest diameter of the fill neck.

12. The fuel tank arrangement as recited in claim 11, wherein the lowermost end of the fill neck defines a maximum level of fuel received in the fuel tank.

13. The fuel tank arrangement as recited in claim 8, wherein the passage is generally rectangular-shaped in vertical cross-section.

14. The fuel tank arrangement as recited in claim 8, wherein the first portion of the uppermost wall intersects at only two of the series of sidewalls.

15. The fuel tank arrangement as recited in claim 8, wherein an uppermost end of the passage is located below an uppermost end of the fill neck.

16. The fuel tank arrangement as recited in claim 8, wherein the uppermost wall is continuously aligned at the non-zero angle between a lowermost end and an uppermost end in the vertical direction.

17. The fuel tank arrangement as recited in claim 8, wherein a lower most end of the upperwall intersects at a third sidewall located opposite the one of the first and second sidewalls.

18. The fuel neck arrangement as recited in claim 8, wherein the first generally horizontal aligned portion of the uppermost wall substantially surrounds a cylindrical perimeter of the fill neck except for where the bridge connects at the fill neck.

19. A fuel tank arrangement, comprising:
   a fuel tank having an interior defined by an uppermost wall, a lowermost wall, and a plurality of side walls extending therebetween, the uppermost wall including a first generally horizontal aligned portion located a spaced distance downwardly in a vertical direction relative to an uppermost edge of a second portion aligned at a non-zero angle relative to horizontal, the interior including an expansion portion defined by the spaced distance between the first portion and the second portion of the uppermost wall;
   a fill neck extending in a generally vertical direction, the fill neck having an uppermost end opposite a lowermost end that connects at the first generally horizontal aligned portion of the uppermost wall;
   a bridge that defines a passage that interconnects the fill neck and the expansion portion of the fuel tank; and
   a cap configured to be received at and enclose the uppermost end of the fill neck, the cap including an opening extending therethrough,
   wherein a lowermost end of the bridge connects at the first portion of the uppermost wall, and wherein the uppermost wall of the bridge is generally continuously aligned at the non-zero angle above horizontal relative to the second portion of the uppermost wall of the fuel tank.

* * * * *